Oct. 28, 1958 E. P. NEHER ET AL 2,858,150

PUSH ROD SEAL

Filed April 22, 1955

INVENTORS
*Eldon Paul Neher*
*Howard Peppercorn*
BY *McCoy, Greene & te Grotenhuis*
ATTORNEYS United States Patent Office 2,858,150
Patented Oct. 28, 1958

2,858,150

PUSH ROD SEAL

Eldon P. Neher and Howard J. Peppercorn, Logansport, Ind., assignors to The General Tire and Rubber Company, Akron, Ohio, a corporation of Ohio Application April 22, 1955, Serial No. 503,140

3 Claims. (Cl. 286—15)

The present invention relates to a seal of general utility for push rods, piston rods, shafts, or various other movable members and more particularly to a resilient cushioning and sealing assembly for a reciprocable push rod such as employed on washing machines or the like.

According to the present invention a resilient bushing or cushioning assembly is provided having an elastic rubber-like ring disposed between inner and outer rigid sleeves. The ring has radially enlarged annular end portions which extend axially beyond the opposite ends of one sleeve to provide radial flanges for sealingly engaging a cylindrical surface of a rigid member throughout the periphery thereof and for preventing leakage of dirt, liquid, or other foreign material along said cylindrical surface to said one sleeve particularly when there is relative movement between said member and said sleeves. The rubber ring serves as a sealing ring and also as a resilient bushing or cushioning element for yieldably resisting movement of said member and said one sleeve in any direction with respect to the axis of the other sleeve.

The resilient cushioning and sealing assembly of the present invention is particularly useful as a mounting for the reciprocable push rod of a washing machine. The radially enlarged end portions of the rubber sealing ring may be engageable with the push rod to provide an effective seal and the intermediate portion of the sealing ring may be radially compressed so as to grip the inner and outer sleeves and to provide an effective resilient cushion.

An object of the present invention is to provide a simple resilient cushioning and sealing assembly which is easy to manufacture, assemble or dissassemble, which contains a minimum number of parts, and which provides an efficient cushion as well as an effective seal.

Other objects, uses and advantages of the present invention will become apparent to those skilled in the art from the following description and claims and from the drawings in which:

Figure 1:
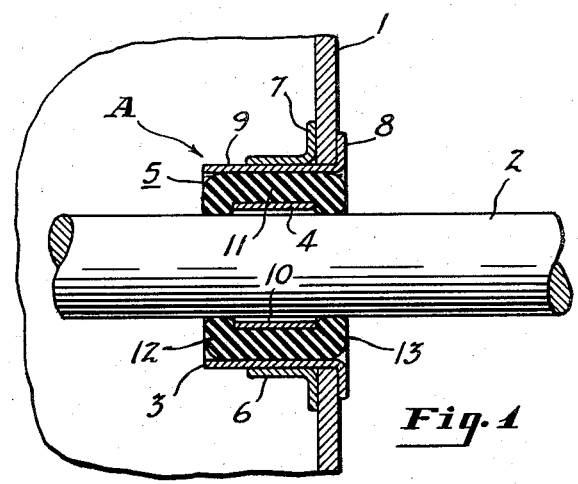
Figure 1 is a fragmentary vertical sectional view taken along the axis of the push rod of a washing machine showing the resilient cushioning and sealing assembly of the present invention.
Figure 2:
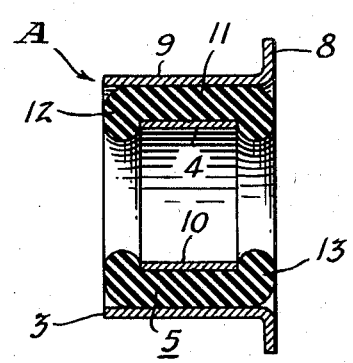
Figure 2 is a longitudinal vertical sectional view of the assembly on a larger scale before it is mounted on the supporting wall.
Figure 3:
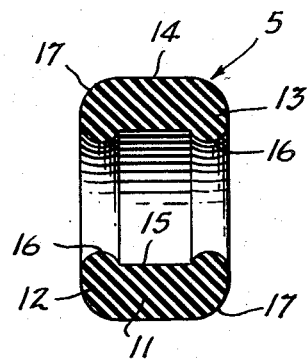
Figure 3 is a longitudinal vertical sectional view on the same scale as Fig. 2 showing the rubber sealing ring in its normal unstressed condition before assembly between the metal sleeves of the assembly.

The assembly is drawn susbtantially to scale in each of Figs. 1 to 3 but it will be understood that the relative sizes and shapes may vary somewhat depending where the assembly is employed, and that features of the invention may be included in various devices which are substantially different from that shown herein.

Referring more particularly to the drawings in which like parts are identified by the same numerals throughout the several views, Fig. 1 shows a portion of a washing machine including a supporting wall 1 and an externally cylindrical push rod 2 mounted for reciprocation perpendicular to said wall. The push rod extends through a circular opening in the supporting wall and is positioned in the opening by a resilient cushioning and sealing assembly A which closes the opening and prevents the leakage of foreign material between the push rod and the supporting wall.

The assembly A is in the form of a resilient bushing consisting of an internally cylindrical flanged outer sleeve 3, an externally cylindrical inner sleeve 4 coaxial with the outer sleeve, and a flexible and elastic rubber sealing ring 5 disposed between said sleeves. The assembly is held in place on the wall 1 by an internally cylindrical annular collar 6 having a circumferentially continuous radial flange 7 for engaging the wall 1. The outer sleeve 3 has a similar radial flange 8 and has an external cylindrical surface 9 with a diameter substantially equal to the internal diameter of the circular opening in the wall 1 and the internal diameter of the collar 6. The collar 6 has a press fit on the outer sleeve 3 and is readily assembled on the sleeve with its flange 7 against the wall 1 to hold the flange 8 of the sleeve rigidly against the wall 1. In the device shown herein, the sleeve 3 and the collar 6 may both be formed of a strong steel or other rigid metal of uniform thickness and the rod 2 may be made of steel or other suitable metal.

The sleeve 4, however, is preferably formed from a bearing metal to reduce friction and wear due to reciprocation of the push rod 2 relative to said sleeve. The inner sleeve 4 has a uniform thickness and has a uniform axial length preferably substantially less than three-fourths that of the outer sleeve 3 or the sealing ring 5. Said inner sleeve has a smooth internal cylindrical surface 10 normarry coaxial with the smooth external cylindrical surface of the push rod 2 and may have a loose fit on the push rod with a few thousandths of an inch clearance between said cylindrical surfaces, but the clearance between said surfaces is preferably substantial so that the surface 10 is usually held by the sealing ring 5 out of contact with the push rod.

The elastic rubber sealing ring 5 is shown in Fig. 3 in its normal unstressed condition prior to assembly and is shown in Fig. 2 after it is inserted between the sleeves 3 and 4 and before the push rod 2 is inserted therethrough. The sealing ring, as shown herein, consists of an intermediate cylindrical portion 11 of uniform radial thickness and integral radially enlarged annular end portions or radial flange portions 12 and 13 of similar size and shape at opposite ends of said intermediate portion. The intermediate portion 11 has an outer cylindrical surface 14 and has an inner cylindrical surface 15 extending axially the full length of said intermediate portion.

As herein shown, the end portions 12 and 13 are of uniform cross section throughout their circumference and have radially inner and outer surfaces 16 and 17 of substantially arcuate cross section. The inner surfaces of revolution 16 project radially inwardly a predetermined distance beyond the inner cylindrical surface 15 to provide rounded annular shoulders or flanges at the opposite ends of said cylindrical surface, and the outer surfaces of revolution 17 are substantially tangent to the outer cylindrical surface 14. The smooth rounded surfaces of the end portions 12 and 13 facilitate assembly of the resilient bushing A.

It will be apparent to those skilled in the art that the elements 3, 4 and 5 may be assembled in various ways, for example using apparatus similar to that shown in Thiry Patent No. 1,961,536 or Robertson Patent No. 2,008,772. After the inner sleeve or core 4 is inserted between the end portions 12 and 13, a funnel-shaped member or other suitable apparatus may be used to facilitate compressing of the rubber ring radially and elongating of the ring axially as it is forced into the outer sleeve 3.

The elastic rubber sealing ring inserted between the inner and outer metal sleeves 3 and 4 may have an intermediate portion normally of a size to fit between said sleeves so that the rubber is not stressed substantially in the assembly A, in which case the sleeve 3 may be provided with retaining flanges or otherwise shaped to prevent axial movement of the sealing ring or may be vulcanized or otherwise bonded to the sleeves 3 and 4. However, the rubber sealing ring is preferably reduced substantially in radial thickness and elongated substantially in the axial direction when it is assembled between the sleeves so that the surfaces of the sealing ring grip and firmly adhere to the sleeves due to the frictional bond. In order to obtain a satisfactory frictional bond between the sealing ring and the rigid sleeves, the radial thickness of the rubber between the sleeves should be reduced materially and preferably substantially more than ten percent. As herein shown, the normal diameter of the outer cylindrical surface 14 as shown in Fig. 3 is substantially greater than the internal diameter of outer sleeve 3 and the normal diameter of the inner surface 15 is substantially less than the external diameter of the bearing sleeve 4 so that after assembly as shown in Fig. 2 the intermediate portion 11 of the elastic rubber ring 5 is elongated a substantial amount axially and is reduced in radial thickness a material amount substantially greater than the radial thickness of the sleeve 4. Since the portion 11 is under considerable radial compression in the resilient cushioning and sealing assembly A, the friction between the rubber surfaces and the metal sleeves 3 and 4 effectively resists axial movement of said surfaces relative to said sleeves and it is unnecessary to provide additional means to prevent such axial movement.

The axial elongation and radial reduction necessary to obtain a firm adherence of the rubber sealing ring to both sleeves is considerable but depends on the stiffness of the rubber and the type of rubber or other rubber-like material employed. Where the rubber sealing ring 5 is is made of the usual type of elastic rubber employed in resilient rubber bushings, the ratio of the axial length of the intermediate portion 11 to its radial thickness should be increased at least about one-fourth and preferably at least about one-half when said intermediate portion is compressed from an unstressed condition to fit between the sleeves 3 and 4. As shown in the drawings, the ratio of the axial length of the intermediate portion 11 to its radial thickness in the assembly A of Figs. 1 and 2 is about twice that of the unstressed portion 11 as shown in Fig. 3 so that the cylindrical inner surface of the sleeve 3 will adhere strongly to the outer cylindrical surface of the sealing ring 5 even when said surfaces are relatively smooth.

As shown herein, the intermediate portion 11 of the sealing ring has a normal axial length as shown in Fig. 3 substantially less than that of the rigid bearing sleeve 4 so that after assembly said intermediate portion has an axial length substantially equal to that of said bearing sleeve and the end portions 12 and 13 engage the opposite ends of said bearing sleeve as shown in Figs. 1 and 2. The axial length of the elastic rubber sealing ring 5 shown herein is also normally substantially less than that of the outer sleeve 3 as shown in Fig. 3 so that the axial lengths of said ring and sleeve are substantially equal in the assembly A after the sealing ring has been elongated axially.

In the normal and unstressed condition of the elastic rubber ring 5 as shown in Fig. 3, the difference between the internal radii of the surfaces 15 and 16 measured from the axis of said ring is greater than the radial thickness of the bearing sleeve so that the end portions 12 and 13 project radially inwardly beyond the inner surface 10 of said sleeve in the assembly A, as shown in Figs. 1 and 2. The internal diameter of each of the end portions 12 and 13 of the assembly A is preferably less than the external diameter of the push rod 2 so that there is always a radial sealing pressure between said rod and said end portions to prevent the passage of water, oil, dirt or other foreign material between said rod and said end portions.

The inwardly projecting circumferential flanges formed by the end portions 12 and 13 are engageable with the ends of the bearing sleeve 10 to limit axial movement of the sleeve on the inner surface of the sealing ring and engage the push rod 2 to hold the sealing ring 5 concentric to the rod and to hold the bearing sleeve 4 concentric to and/or out of contact with said rod as shown in Fig. 1. Said flanges engage the rod throughout its circumference to provide an effective seal at opposite ends of the bearing sleeve 4 and minimize the friction between said sleeve and said rod when said rod is reciprocated. In the assembly A the end portions 12 and 13 have a radial thickness greater than that of the compressed intermediate portion 11 so as to engage both the rod 2 and the internal cylindrical surface of the outer sleeve 3 and so as to resist rocking movements of the push rod relative to the outer sleeve. Such rocking movements compress the elastic rubber of one of the end portions 12 and 13 between the rod and the outer sleeve and may cause misalinement between the inner sleeve 4 and the outer sleeve. The intermediate portion 11 cushions movements of the inner sleeve relative to the outer sleeve and yieldably resists such movements as in conventional rubber bushings.

It is to be understood that, in accordance with the provisions of the patent statutes, variations and modifications of the specific device disclosed herein may be made without departing from the spirit of the invention.

Having described our invention, we claim:

1. A seal comprising a pair of endless rigid concentric sleeves, a rubber sealing ring under radial compression between said sleeves and having rounded transversely convex end portions extending axially beyond the opposite ends of one sleeve, said one sleeve having a cylindrical internal surface, and a rigid member having a smooth continuous cylindrical surface concentric to and adjacent to the internal surface of said one sleeve, said rigid member and said sealing ring being mounted for movement axially relative to each other, said end portions sealingly engaging said smooth cylindrical surface at opposite ends of said one sleeve and having a thickness at least equal to the radial distance between said rigid member and the other sleeve to provide means for engaging said rigid member and said other sleeve to resist rocking movement of said rigid member relative to said other sleeve, the average radial thickness of the portion of said sealing ring between said sleeves being at least 10 percent less than that of said portion in the normal unstressed condition, said one sleeve being supported and held concentric to and out of contact with said rigid member solely by said sealing ring.

2. A resilient cushioning and sealing assembly comprising a support, a rigid endless outer sleeve mounted on said support, a rigid inner sleeve substantially coaxial with said outer sleeve and having an axial length substantially less than that of said outer sleeve, an externally cylindrical rod extending through said inner sleeve and mounted for movement axially relative to said support, a rubber sealing ring having an annular intermediate portion of reduced thickness between said sleeves and radially enlarged annular end portions extending axially beyond the opposite ends of said inner sleeve, said intermediate portion having a radial thickness in the normal unstressed condition materially greater than the distance between said sleeves so that said intermediate portion is reduced in thickness and elongated axially between said sleeves, the ratio of the axial length of said intermediate portion to its average radial thickness when said intermediate portion is in its normal unstressed condition being at least one-fourth less than that when said intermediate portion is compressed between said sleeves, said end portions engaging said outer sleeve and engaging said rod at opposite ends of said inner sleeve to prevent movement of foreign material between said rod and said inner sleeve.

3. A resilient cushioning and sealing assembly comprising an endless outer cylindrical sleeve, an externally cylindrical rod extending through said sleeve and mounted for movement axially relative to said sleeve, an inner cylindrical sleeve concentric to said rod and said outer sleeve and having an internal diameter not materially greater than the external diameter of said rod, said inner sleeve having an axial length substantially less than that of the outer sleeve, an elastic rubber sealing ring having an intermediate portion confined between said sleeves and opposite annular end portions extending axially beyond the opposite ends of said inner sleeve, each end portion having a smoothly curved convex surface including radially inner and outer surfaces of generally arcuate cross section, the inner surface projecting radially inwardly beyond the inner sleeve to provide a rounded annular flange for engaging said rod and the outer surface being substantially tangent to the outer cylindrical surface of said intermediate portion, whereby each end portion has a radial thickness substantially greater than that of said intermediate portion and said inner sleeve is supported solely by said sealing ring, said end portions having a thickness at least equal to the radial distance between said rod and said outer sleeve to provide means for engaging said rod and said outer sleeve to resist rocking movement of said rod relative to said outer sleeve.

References Cited in the file of this patent

UNITED STATES PATENTS

| | | |
|---|---|---|
| 1,891,725 | Payne | Dec. 20, 1932 |
| 2,014,313 | Damsel | Sept. 10, 1935 |
| 2,173,250 | Fay | Sept. 19, 1939 |
| 2,237,758 | Kurzweil | Apr. 8, 1941 |
| 2,274,234 | Ekkebus et al. | Feb. 24, 1942 |
| 2,294,452 | Guy | Sept. 1, 1942 |
| 2,420,039 | Frisby | May 6, 1947 |
| 2,728,593 | Hutton | Dec. 27, 1955 |

FOREIGN PATENTS

| | | |
|---|---|---|
| 718,438 | Germany | Mar. 12, 1942 |